United States Patent [19]
Lancry et al.

[11] Patent Number: 5,687,999
[45] Date of Patent: Nov. 18, 1997

[54] THREADED JOINT FOR TUBES

[75] Inventors: Alain Lancry, Banchory, United Kingdom; Michihiko Iwamoto, Wakayama, Japan

[73] Assignees: Vallourec Oil & Gas, Aulnoye-Aymeries, France; Sumitomo Metal Industries, Osaka, Japan

[21] Appl. No.: 538,436

[22] Filed: Oct. 3, 1995

[51] Int. Cl.$^6$ .................................................. F16L 15/00
[52] U.S. Cl. ........................... 285/333; 285/334; 285/355
[58] Field of Search .................................. 285/333, 334, 285/355, 390

[56] References Cited

U.S. PATENT DOCUMENTS

| | | | |
|---|---|---|---|
| 1,927,656 | 9/1933 | Eaton et al. | 285/334 |
| 2,062,407 | 12/1936 | Eaton | 285/334 |
| 2,204,754 | 6/1940 | Frame | 285/334 |
| 2,211,179 | 8/1940 | Stone | 285/334 |
| 2,772,102 | 11/1956 | Webb | 285/334 |
| 2,992,019 | 7/1961 | MacArthur | 285/334 |
| 4,161,332 | 7/1979 | Blose | 285/334 |
| 4,253,687 | 3/1981 | Maples . | |
| 4,521,042 | 6/1985 | Blackburn et al. . | |
| 4,570,982 | 2/1986 | Blose et al. . | |
| 4,624,488 | 11/1986 | Furgerson . | |
| 4,662,659 | 5/1987 | Blose et al. . | |
| 4,796,928 | 1/1989 | Carlin et al. . | |
| 4,838,068 | 6/1989 | Carlin et al. . | |
| 5,029,906 | 7/1991 | Chelette et al. . | |
| 5,092,635 | 3/1992 | Delange et al. . | |
| 5,415,442 | 5/1995 | Klementich | 285/334 |
| 5,462,315 | 10/1995 | Klementich | 285/334 |

FOREIGN PATENT DOCUMENTS

WO 93/18329  9/1993  WIPO.

*Primary Examiner*—Eric K. Nicholson
*Attorney, Agent, or Firm*—Oblon, Spivak, McClelland, Maier & Neustadt, P.C.

[57] ABSTRACT

A joint of the integral type includes a male element 1 and a female element 2 with a diameter close to that of the tubes. Each of the elements has two shifted frustoconical threaded sections 4, 5, 6, 7 with vanishing threads at the two ends, by virtue of convergences of frustoconical envelope surfaces 16, 17, 18, and 19 and cylindrical surfaces 20, 21, 22, 23. A central abutment 24 cooperates with the negative-flank threads to reinforce the male/female connection and two internal 27 and external 28 ring-shaped metal/metal tightness zones, preventing the penetration of fluid into the threaded zones from the ends. The threaded joint may be used with tubes for very deep wells for which the reduction of the diameter of the assemblies makes it possible to lower costs, and other tubes for which a problem of the same type may arise.

13 Claims, 3 Drawing Sheets

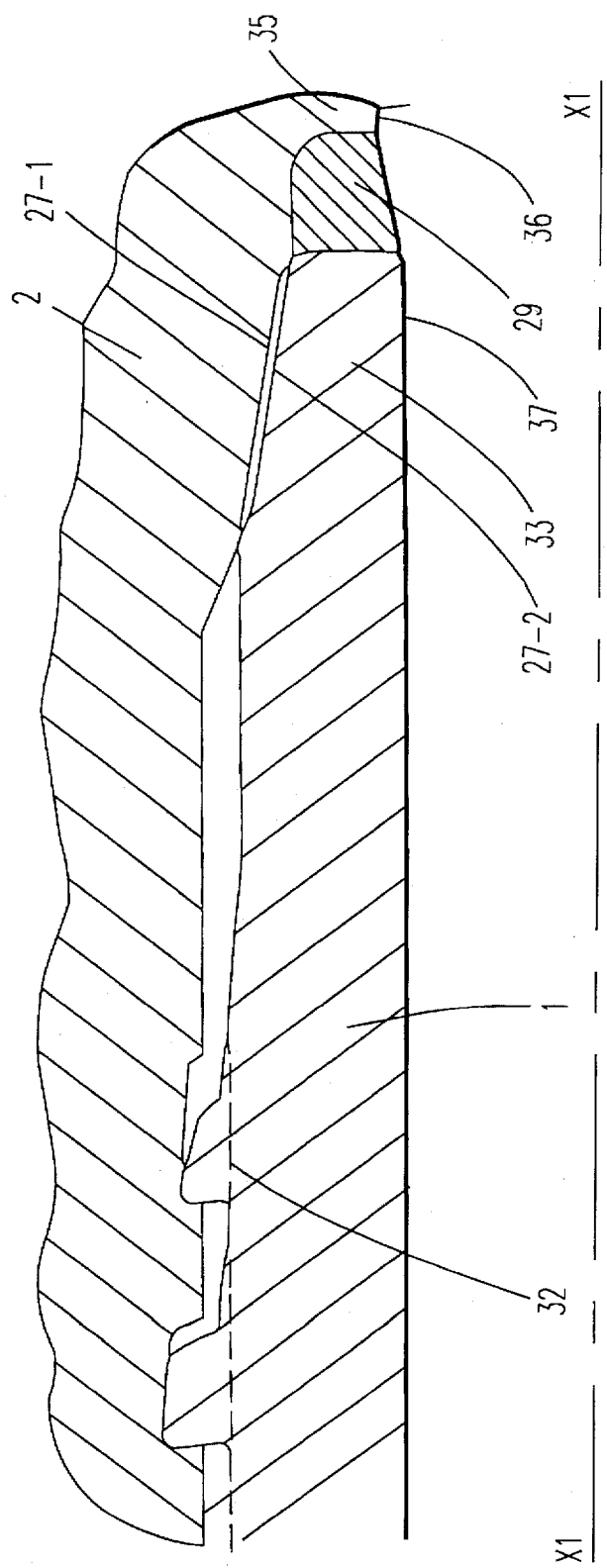
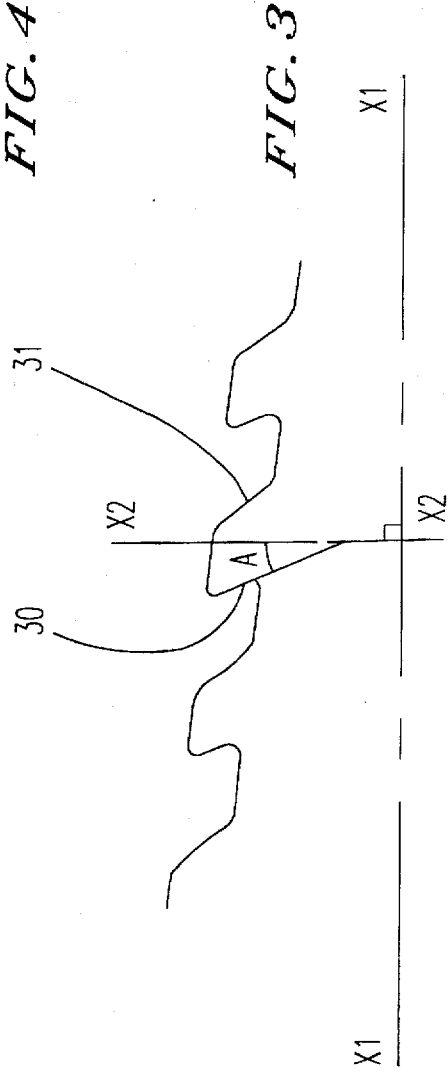
FIG. 4
FIG. 3

THREADED JOINT FOR TUBES

BACKGROUND OF THE INVENTION

1. Field of the Invention

The present invention relates to joints or assemblies of tubes to be joined by means of threadings, and concerns tubes used in industry and, in particular, assemblies or threaded junctions used in stringlines for tubing or for lines of tubular production accessories or for a casing for the operation or prospecting or exploitation of oil or gas wells, as well as threaded assemblies or junctions used for any purpose where it may be necessary to assemble pipelines or tubular accessories such as, for example, in geothermal or steam plants. The threaded assembly according to the invention is particularly useful in the assembly of metal tubes used for the casing of oil or gas wells, as explained below. The terms assembly or joint or junction will be used in the text as having the same meaning, except for particular contexts. By pipes, is meant any type of tubes or tubular components or tubular accessories currently in existence or likely to be put to use in industry, said tubes generally being metal tubes.

2. Background of the Invention

Numerous types of assemblies are known for petroleum or gas carrying tubes that yield satisfactory results from the viewpoint of mechanical characteristics and tightness, even under tough conditions of use. Certain of these assemblies involve the use of tubes equipped with male frustoconical threadings at both ends, which are assembled by means of couplings having two corresponding female frustoconical threadings. This manner of assembly offers the advantage of rendering the two components of the assembly rigid, due to the existence of the positive interference that one can create between the male threading and the female threading.

However, the external diameter of these couplings is greater than that of the corresponding tubes and, when these assemblies are used with casing tubes, requires the drilling of bore holes with increased diameter. In the case of very deep wells, with a depth exceeding 4,000 meters, the initial diameter of the well first casing strings and consequently the diameter of the well in the vicinity of the surface may be twice as large using these couplings as it could be using slim couplings having an external diameter only slightly larger than the corresponding tubes of the casing strings.

To prevent this difficulty, one may use assemblies without a coupling or sleeve. In this case, the tubular elements each have one male threaded end and one female threaded end, making for a thin assembly. These assemblies or junctions are generally called integral assemblies or junctions, in contrast to assemblies or junctions employing a coupling or sleeve.

Such integral assemblies are generally made on tubes whose diameter at the end corresponding to the female threading is expanded, and whose diameter at the end corresponding to the male threading is reduced. This is done in order to have sufficient material in the thickness of the tubes to ensure the geometric and mechanical strength of the assembly that joins the tubes.

It is furthermore possible to reinforce the strength of the male-female assembly by using threadings in two successive sections instead of only a single one, with a change of dimensions when passing from one section to the other. Thus, U.S. Pat. No. 4,624,488 describes a threaded assembly comprising two cylindrical threaded sections having different threading diameters. This makes it possible to place a central ring-shaped abutment between these two sections. This abutment makes it possible to achieve sufficient tightening of the threadings while at the same time avoiding excessive on-screwing. In the case of threads with negative load flanks, the abutment makes it possible to tighten these threads on their negative flanks and this reduces risks of thread disengagement due to the action of traction stresses that may or may not be combined with strong pressures.

U.S. Pat. No. 4,570,982 describes a similar assembly comprising two threaded sections whose threading is cylindrical or frustoconical. The load flanks of the threads there have a negative inclination, and the abutment between the threaded sections has a generatrix that is inclined in the opposite direction. A sealing surface is provided on each element adjacent to the central abutment so as to ensure metal-to-metal tight contact due to the combined action of the abutment and the negative load flanks.

In the case of the two patents heretofore described, the thickness of each of the two components in the central zone, on the side of the abutment where its diameter is smaller, has a value that is further reduced by the height of the threads of the adjacent threading section. Thus, each component of the assembly has a zone provided with a critical thickness that is reduced when compared to the nominal wall thickness of the corresponding component.

One way of reducing the height of the frustoconical threads at the end of the components of a junction, in order to increase the mechanical strength thereof, is described in British Patent GB 1,587,836. In FIGS. 6 and 7 of that patent, one can see threading ends comprising so-called vanishing threads. However, this patent does not apply to making thin and high resistance assemblies.

Patent Application PCT WO 93/18329 describes a threaded assembly for tubes, having a tight connection made by use of a stabilized central shoulder. This assembly comprises two frustoconical threadings that are shifted with respect to each other, one of which presents vanishing threads at least at its end near the central shoulder. As shown in FIGS. 5 (A, B, C) or 10 (A, B, C), each component of the central shoulder is folded in the shape of an annular hook, the two hooks being suitable for penetrating each other. According to the description, this interpenetration makes it possible to create several tight metal/metal seals in series, which then retain very good tightness. The use of vanishing threads facilitates the assembly by reducing the risk of jamming male and female threads and it also makes it possible to increase the useful section of each of the two components of the assembly in the vicinity of the central zone.

Although the particular and complex structure of the central shoulder described in this PCT patent application may be designed to play a double role as abutment and seal joint, experience shows that it is difficult for such a component to perform these two functions in a satisfactory fashion. As a matter of fact, an abutment must preferably have high strength if one wishes to stop the advance of the male element into the interior of the female element at a certain point so as to prevent excessive on-screwing. One can achieve this result relatively easily when the central abutment is in a zone where the two components of the assembly have a large cross-section and are made so that they are tightly connected together. On the other hand, to get good sealability, it is necessary to have an elastic tightening of the surfaces in contact because otherwise one runs the risk of being able to obtain tightness only by way of plastic deformation. In this case, the junction rapidly loses its sealability qualities in the course of successive screwing and unscrewing operations. This sealability loss is essentially due to the fact that surfaces are damaged by galling.

The aforementioned PCT Patent Application indicates that the use of lubricants, such as API lubricant, makes it possible to improve the sealability of the joint. But this type of lubricant has the disadvantage, particularly at relatively high temperatures, of leaving solid deposits in the ring-shaped folds, such as those shown in FIGS. 5(A, B, C). These deposits then obstruct a correct interpenetration of the hooks. Furthermore, the threaded assembly described in this PCT document employs specific threading shapes, in particular, in the form of dovetails that are more difficult and more expensive to manufacture and to use than standard thread forms known for this type of application.

Considering these problems, the present inventors looked into the possibility of making a thin threaded assembly for tubes, in particular, for petroleum carrying tubes and other tubes used most often for drilling at great depths, with a simple and effective structure. The present inventors first tried to make a central abutment structure as strong as possible in resisting deformation in order to permit setting the depth of advance of the male element into the female element with great precision. In the vicinity of the central assembly zone, the present inventors tried to obtain a critical thickness for each of the two male and female elements that would be as great as possible, while resorting to assemblies whose outside diameter is close to or a little greater than that of a mid-portion of the tube body on which the assembly is cut.

The possibility of making metal/metal seals that would also be effective against internal and external over-pressures and that, in particular, would be capable of protecting the threadings of the assembly over their entire length against the penetration of fluids coming from inside or outside was also examined. The present inventors furthermore researched the possibility of giving these metal to metal seals the desired elasticity so that they may retain their tightness in spite of the elastic deformations resulting from traction or axial compression that may or may not be combined with internal or external over-pressures or even elastic bending of the assembly with respect to its axis.

The present inventors also explored the possibility of preserving this kind of sealability over many screwing and unscrewing cycles.

Finally, the present inventors explored the possibility of achieving all of these results by means of simple machining methods, permitting easy mounting and assembly in a single operation, where the central abutment makes it possible not only to control the mechanical tightening conditions of the assembly but also the conditions for obtaining sealability.

SUMMARY OF THE INVENTION

It is an object of the invention to provide a threaded joint for tubes of the integral joint type that achieves some or all of the above results.

The threaded joint, intended to connect two tubes according to the invention, consists of a male element and a female element placed at the ends of the tubes to be joined. The male element is equipped with an external threading and the female element is equipped with an internal threading corresponding to the threading of the male element. Each of these threadings consists of two radially shifted frustoconical sections, with the two sections of each element being separated by a ring-shaped abutment surface. Each section is equipped with vanishing threads at each of its ends.

The threadings are advantageously made up of threads whose load flank has a negative slope.

The height of the vanishing threads in each threading end zone is limited by the convergence of an external or internal frustoconical surface, situated along the prolongation of a mid-portion of the threading and an interior or exterior cylindrical surface parallel to the axis of the tube.

The height of the ring-shaped abutment surface is essentially equal to the radial spacing of two cylindrical surfaces that limit the heights of the vanishing threads adjacent to said central abutment surface. At the end of the screwing operation, engagement of the abutment surfaces of the male and female elements causes the tightening of the load flanks of the male threads against the female threads. When these threads have load flanks with negative angles, the radial component of the tightening force enhances the radial cohesion of the male and female elements to each other. The abutting abutment surfaces form a shoulder-like central abutment. The term abutment or abutment surface or shoulder will be used hereinafter as having the same meaning, except for particular contexts as the case may be.

On the male element and on the female element, in each of the threading-free zones situated beyond the end of each of the threaded sections opposite to the central abutment surface, there is positioned a seal surface. The two sealing surfaces situated on the same side of the central abutment being dimensioned, positioned, and designed to correspond to each other and to constitute a ring-shaped, fluid tight metal/metal contact zone on the assembled joint.

In this way, the two sealing surfaces which, on each side of the joint, constitute a ring-shaped tightness zone against the, respectively, internal and external pressure of the fluid circulating in the tubes or outside the tubes, are tightened elastically against each other when the male element is made to abut against the female element at the ring-shaped central abutment.

These sealing surfaces may be constituted by all surfaces which create, during the assembly of the joint, an elastic deformation that ensures metal/metal contact, all of the sealing surfaces not having necessarily the same shape.

These seal surfaces are advantageously formed as frustoconical surfaces. The angles of these frustoconical surfaces may advantageously be between 8° and 12°, the angle being measured with respect to the common longitudinal axis of the joint. These values are by no means restrictive. The values of the angles corresponding to one pair of bearings are not necessarily the same as the values corresponding to the other pair.

Generally speaking, these bearings are individually designed to obtain on the installed joint a tightness that results from a deformation that remains within the elastic domain.

As described later on, the different factors cooperating in making the threaded joint according to the invention permit one to obtain a joint with a diameter close to or only a little greater than that of the tube, which has excellent mechanical characteristics and excellent tightness.

As noted earlier, the joint comprises two frustoconical threading sections. At each of its ends, each section has a small number of threads that are called vanishing threads, for which the very small initial height of each thread increases from the start of the threading in an essentially linear fashion until it attains the height which is that of the threads in the mid-portion of the threading. This result is obtained for the two threading sections of the male component by machining the roots of the threads at the start of the large-diameter zone of each of these sections with a constant slope and, hence, a diameter that decreases from the point of departure and up to the end of the mid-portion of the section. One machines the crests of the corresponding male threads to have a constant diameter, and thus to have a height that increases from the point of departure of the threading up to the start of the mid-portion and then, up to the end of the section with the constant thread height, extending parallel to the slope of the roots of the threads.

Starting from the small-diameter end of the mid-portion, one machines the roots of the male threads with constant diameter, whereas the crests of the male threads continue to be machined at constant slope up to the intersection of the frustoconical surface and the cylindrical surface.

For the female element, machining is done in such a way that the male and female threadings will penetrate each other in the vanishing zones of the threads, even though the residual height of the latter is very small. To achieve this, one does the opposite of what has just been described for the male element. For each of the two sections of the female threading, starting with the beginning of the large-diameter zone, one machines the roots of the threads with a constant diameter up to the beginning of the mid-portion and then at a constant slope, including the final zone with vanishing threads. The crests of the threads are machined at constant slope in the zone of increasing height and in the mid-portion, then with a constant diameter in the final zone with the vanishing threads.

One can see that, in the assembly thus obtained, the critical thickness zone in the mid-portion of the male element corresponds to the diameter of the intersection of the frustoconical envelope surface of the roots of the male threads with the cylindrical envelope surface of the crests of the male threads of the threading section that is closest to the end of the corresponding tube. For the female element, the critical thickness zone in the mid-portion of the female element corresponds to the diameter of the intersection of the frustoconical envelope surface of the roots of the female threads with the cylindrical envelope surface of the crests of the female threads of the threading section that is closest to the end of the corresponding tube. One can see that the radial distance between the two diameters thus defined corresponds to the maximum height that can be given to the ring-shaped abutment zone between the two threaded sections. The use of vanishing threads, as described, makes it possible, for a certain abutment height, to give the critical thickness of each element a value that will be as great as possible. The number of vanishing threads at each end of each threading section depends on the height of the threads at the mid-portions and the pitch. In practice, each of these terminal zones comprises most often 3 to 4 threads; but this value is not in any way restrictive.

The mechanical strength of the two elements of the joint with respect to each other depends to a good deal on the profile of the threading. One advantageously uses threadings whose load flank ensures metal/metal contact on the joint in the screwed condition with a negative inclination, that is to say, where the load flank of the thread has a generatrix that is inclined toward the outside of the thread. The negative angle is most often between 3° and 20° with respect to a plane perpendicular to the axis of the element, and it is preferably between 5° and 15°. As indicated earlier, this inclination makes it possible, by tightening the male and female elements after they have been made to abut, to tighten the threaded zones against each other and thus to prevent the risks of disjointing at the threads.

The central shoulder abutment, whose height one determines as a function of the dimensions of the male and female elements and the threadings, can have a zero slope with respect to a straight plane extending perpendicular to the axis of the component. It can also have an inclination between 0° and about 20° with respect to such a straight plane. This inclination is oriented in the direction toward the inside of the male element. This inclination contributes to tightening the two components of the assembly against each other in the central part.

The stabbing flank is preferably inclined toward the interior of the thread with respect to a straight plane extending perpendicular to the axis, at an angle that is greater than or equal to the angle of the load flank, comprised, for example, between 8° and 30°.

To facilitate the stabbing of the male threads in the female threads, one may advantageously equip the stabbing flanks with a chamfer close to the thread crest. This chamfer, which has an angle greater than that of the stabbing flank, has a slope that is increased with respect to the zone of that same flank that is closer to the root of the thread.

The height of the threads in the mid-portion is, for example, about 6 to 12% of the thickness of the tube. The slope of each of the two threading sections is, for example, about $1/16$ to $1/10$ with respect to the axis; none of these values is restrictive.

If one gives the central abutment a height that is not excessive, then it is possible to make a joint whose critical thickness in the male and female components in the vicinity of the abutment is sufficient, particularly thanks to the two frustoconical threading sections with vanishing threads, to provide excellent mechanical characteristics.

As noted earlier, one cannot achieve good metal/metal tightness in the vicinity of the shoulder due to the great rigidity of the components in this zone. On the contrary, it is possible, by putting the seal surfaces on the joint as explained earlier, to achieve metal/metal tightness under optimum conditions at the two ends of the assembly. A ring-shaped internal tight metal/metal contact zone is made between the small-thickness end of the male element, beyond the small-diameter end of the threading, and the large-thickness end of the female element, and a second ring-shaped tight metal/metal contact zone is made between the small-thickness end of the female element, beyond the threading, and the large-thickness corresponding end of the male element. The opposite seal surfaces of the male and female elements have geometries, dimensions, and positions such that, during the screwing of the joint, the end of the thin-wall element will be elastically deformed in the ring-shaped tight metal/metal contact zone with a slight variation of its diameter, while the diameter of the thick wall remains essentially unchanged.

One preferably gives these seal surfaces such a profile that the tightness metal-metal contact will take place in a narrow but well-defined ring-shaped zone.

The extension of the seal surfaces along the axis of the joint is determined so that the relative movements of one of the elements of the assembly with respect to the other one resulting from the traction or compression efforts exerted on the ends, or resulting from the external or internal over-pressures, do not modify the tightness performance of these external and internal seals, even if there are measurable displacements between the two bearings of each of the ring-shaped tight metal/metal contact zones.

Due to these ring-shaped metal/metal seal zones, one can prevent the penetration and the contact with threadings of pressurized fluids coming from the inside or outside. One can thus prevent any and all risk of corrosion of threadings or of abutment zones, as well as any risk of disjointing due to the effect of pressure.

To improve the quality of the tightness surfaces and, in particular, their resistance to galling, one can in the known fashion administer a surface treatment to the male and female elements of the assembly, for example by phosphatation with zinc or with manganese, or by depositing copper or any other metal, or by the application of a solid lubricating layer such as, for example, a layer of molybdenum bisulfide or any other treatment most often accompanied with suitable lubrication.

For certain uses, one can provide complementary tightness, consisting of a ring, for example, made up of elastomer, which one houses in the immediate vicinity of the edge of the distal end of the male element in a suitable groove. One can thus protect the tightness surfaces which ensure metal/metal connection against any attack by a corrosive fluid coming from the inside. Depending on the placement of this ring, one can also ensure the geometric continuity of the internal diameter (flush joint) and one can avoid any turbulence zone in the fluid stream.

Each tube to be assembled is equipped at one end with a male element and at its other end with a female element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a partial cut-away view along axis X1—X1 of the profile a male frustoconical threading section of the joint according to the invention; and FIG. 4 is a partial cut-away view of the end zone of the male element of the joint according to the invention, showing the profile of the seal surfaces situated at the end of the male element.

DETAILED DESCRIPTION OF THE PREFERRED EMBODIMENT

Figure 1:
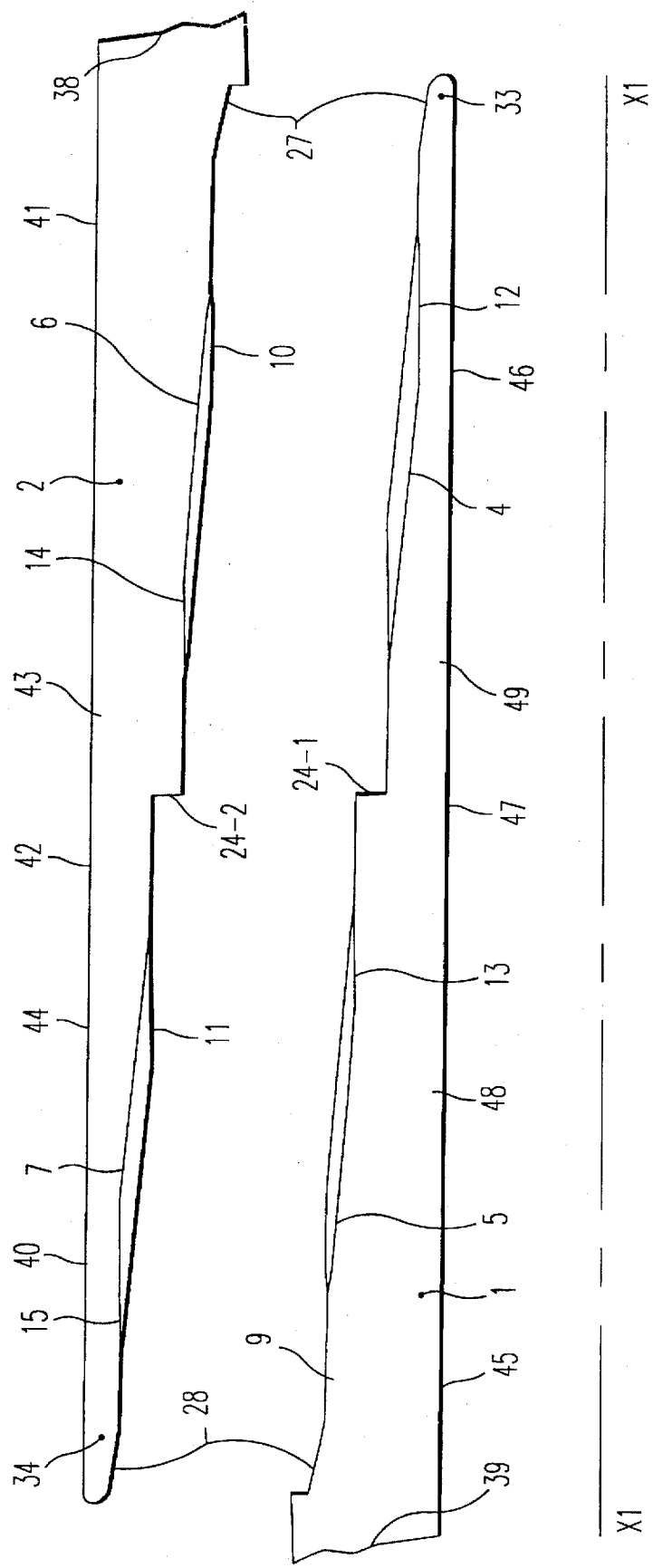
FIG. 1 is a longitudinal half-section view of the male and female elements of the joint according to the invention, half cut away, along their X1—X1 axis and not assembled. The male and female threadings are represented only by the profiles of the envelope surfaces of the crests and roots of the male and female threads.
Figure 2:
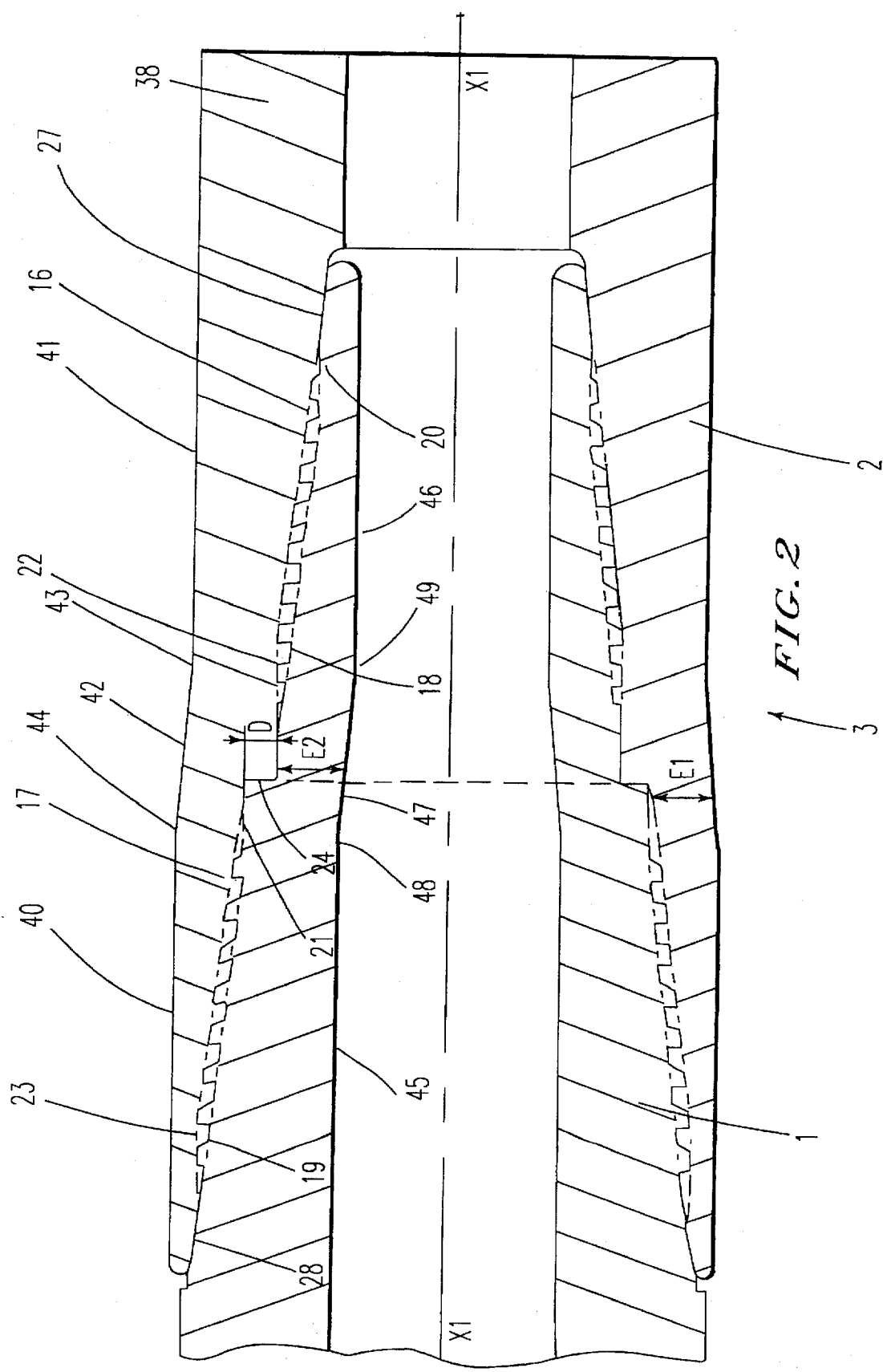
FIG. 2 is a cross-section view of the joint according to the invention with the male and female elements assembled.

FIG. 1 is a longitudinal half-section view of the two elements, male element 1 and female element 2, situated at the end of two tubes 38, 39, only whose ends are shown, thereby forming joint 3, shown schematically in FIG. 2, between the two tubes 38, 39. These tubes have the same inside and outside diameters. For clarity of illustration, male element 1 and female element 2 are shown separated from one another in FIG. 1.

Each male and female element has a region with two threading sections, respectively threading sections 4, 5, for male element 1 and threading sections 6, 7 for female element 2, between which is located a ring-shaped abutment surface or shoulder 24-1, 24-2. The mid-portions of these threading sections 4, 5 and 6, 7 are frustoconical.

The four frustoconical threading sections 4, 5 of the male element, and 6, 7 of the female element, have at each of their ends a zone of vanishing threads in which the heights of the threads diminishes to a zero value. The decrease in the height of the threads may be accomplished either by machining the crests of the threads to a constant diameter with respect to the axis of the male or female element, as can be seen in zones 8 and 9 of the male threading sections 4 and 5 as well as in zones 10 and 11 of the female threading sections 6 and 7, or by machining constant diameter thread roots with respect to the axis, as in zones 12 and 13 of male threading sections 4 and 5 as well as in zones 14 and 15 of female threading sections 6 and 7. One can thus see that, by assembling the two male and female elements, their threads engage completely in the corresponding housings, both in the mid-portions of the threadings and in the end zones with the vanishing threads.

As shown in FIG. 2, in these end zones, the crests and roots of the vanishing threads are limited toward the outside or toward the inside by the convergence of an external frustoconical surface 16, 17 or an internal frustoconical surface 18, 19, each of which prolongs the surface of the mid-portion of the threading, and an internal cylindrical surface 20, 21 or an external cylindrical surface 22, 23. One can see that the difference between the diameters of these cylindrical surfaces 21 and 22 corresponds to the radial height "D" of the ring-shaped abutment or shoulder 24 in the central zone of assembly 3. This ring-shaped abutment or shoulder 24 is made up by having the two surfaces 24-1, 24-2 of male element 1 and female element 2 (FIG. 1) abut against each other.

It is to be noted that abutment 24 does not perform any tightness or sealing function. The generatrix of abutment surface 24-1, 24-2 is perpendicular to axis X1—X1 of the assembly. One can eventually incline this generatrix with respect to the axis X1—X1 by an angle of about 90° to 70°, oriented toward the thin distal end of the element on which it is located.

The load flanks of the male threads, such as 30 (FIG. 3), have a generatrix with a negative inclination A of about −3° to −20°, and preferably −10°±5°, with respect to a line extending perpendicularly to axis X1—X1 of the element. Upon screwing, the cooperation between these threads with negative load flank and abutment 24 makes it possible to tighten male element 1 and female element 2 against each other. This practically eliminates the risks of disjointing or separation at the threads.

The shoulder (or abutment) surface 24-1 on the male and 24-2 on the female, perpendicular to the X1—X1 axis, increase, for a given radial difference D, the mechanical strength of the joint, and consequently makes it also possible to give the critical thicknesses E2 on male and E1 on the female, a value as large as possible. The absence of metal/metal tightness surfaces in the central zone—surfaces whose effectiveness is, as already explained, not satisfactory due to the rigidity of this zone—makes it possible to move the two frustoconical threading sections 4, 5 and 6, 7 closer to each other, and thus to improve the joining action between the two male and female elements.

To facilitate the insertion or stabbing of the male threads in the female housings, one advantageously gives the stabbing flanks, such as 31, a slope whose generatrix has a positive inclination that is greater in absolute value than that of the negative inclination of the load flank angle, the value of the inclination being about +8° to +30°. In the case of this example, one thus gives the load flanks a negative inclination of −10° and the stabbing flanks an inclination of about +25°. One may possibly further facilitate stabbing by making chamfers in the upper ends of the stabbing flanks, thereby producing a slope that is increased by about 15° to 35° with respect to the adjacent parts of the stabbing flanks, and extending to the bases of the stabbing flanks.

As shown in FIGS. 1, 2 and 4, two fluid tight metal-to-metal seal surfaces 27, 28 are arranged at the internal and external ends of the joint, beyond the ends of the threaded portions. In the example shown, these seal surfaces are essentially frustoconical surfaces on the male and female elements having the desired inclination so as to come into contact with each other, said contact being accompanied by an elastic deformation of the respective thin ring-shaped wall. This elastic deformation is in compression for the distal end of the male element and in expansion for the distal end of the female element.

FIG. 4 shows the distal end of male element 1, fully screwed in female element 2, in a half-section along axis X1—X1. It clearly shows the interference that is provided between tightness surfaces 27-1 and 27-2, which are shown (for clarity of illustration) with overlap, the last vanishing threads appearing at 32. In fact, the elastic deformation by way of compression of the distal end 33 of male element 1 allows its tightness surface 27-1 to elastically press against the corresponding surface 27-2 of the thick portion of female element 2, while the elastic deformation takes place almost exclusively on distal end 33.

The ring-shaped tight metal/metal contact zone thus made on the inside of the assembly protects the threadings against the penetration of fluids contained inside the tubes. To prevent risks of corrosion of the tightness surfaces themselves, one may, if necessary, put an elastomer ring 29, filling the space between distal end 33 of male element 1 and the internal end 35 of the female element. This deformable ring will advantageously be dimensioned to fill the volume between end 33 of male element 1 and the internal end 35 of the female element and will ensure the continuity of passage from the inside diameter 36 of tube 38 having the female element to the inside diameter 37 of the male element.

The structure of the external metal/metal seal surface 28, made between the thin-wall distal end 34 of female element 2 and the thick wall part of male element 1, is similar to the one that has just been described for the bearing 27. At the time of tightening the joint there is interference between the tightness surfaces that come into contact against each other, accompanied by elastic expansion of the thin female wall.

The double protection of the threading thus obtained turns out to be particularly effective at preventing any risk of over-pressure inside the threadings. The elasticity of the thin distal ends of male element 33 and female element 34 allows them to keep up with any relative movement of the end zones of one assembly element with respect to the other, particularly in case of traction or compression effects.

It is important to note that the only surfaces to abut against each other are ring-shaped abutment surfaces 24-1, 24-2. In no case does distal end 33 of male element 1 abut, during the screwing of the joint, against the internal end 35 of female element 2. The same is true of distal end 34 of female element 2 with an opposing surface at the end of male element 1.

Depending on the dimensions of the tubes on which the integral joint according to the invention is to be made, one could, if necessary, make the outside diameter of the end of female element 2 so as to have additional thickness at the level of threading section 7 and end 34. This can be done by expanding, over at least one portion of the end, the outside diameter 40 of this female element 2 prior to the manufacture of the elements of the joint. Thus, FIG. 1 shows a female element 2 that has retained the original diameter 41 of the tube over a portion of the length. This diameter 41 is joined to the expanded diameter 40 of end by an essentially frustoconical connection shape 42 between regions labelled 43 and 44.

Likewise, one may proceed in a similar fashion in the case of the inside diameter 45 of tube 39 in which male element 1 is made. In this case, as shown in FIG. 1, one reduces the inside diameter 46 over at least a portion of the end. Here, this diameter is reduced at the level of threading section 4 and at end 33. The connection is made, as before, in the form of a truncated cone at 47 between regions labelled 48 and 49. In this way, one gets greater strength without the inconvenience of using a coupling or sleeve.

The expansion of outside diameter of the female element 2 and the reduction of the inside diameter of the male element 1 are also shown in FIG. 2.

The integral joint according to the invention, thus built, makes it possible to combine very great mechanical strength due to the extremely compact structure of this assembly, in its central zone, with excellent tightness, due to the placement of ring-shaped tight metal/metal contact zones, employing tightening by elastic deformation of the seal surfaces. As indicated earlier, appropriate surface treatments, well known in the art, make it possible to considerably improve the galling resistance of the tightness surfaces and their aptitude to undergo numerous screwing-unscrewing operations without losing their tightness.

Obviously, numerous modifications and variations of the present invention are possible in light of the above teachings. It is therefore to be understood that the invention may be practiced otherwise than as specifically described herein.

What is claimed is:

1. A threaded joint for tubes, comprising:

a male element having a region with external threading comprising two radially shifted frustoconical sections of threadings having load flanks with a negative slope, said two frustoconical sections of said external threading being separated by a first ring-shaped abutment surface, said male element having at opposite axial ends of said region external surfaces forming tightness surfaces, each of said two frustoconical sections of said external threading having vanishing threads at opposite ends thereof; and a female element having a region with internal threading comprising two radially shifted frustoconical sections of threadings having load flanks with a negative slope, said two frustoconical sections of said internal threading being separated by a second ring-shaped abutment surface, said female element having at opposite axial ends of said region internal surfaces forming tightness surfaces, each of said two frustoconical sections of said internal threading having vanishing threads at opposite ends thereof, wherein said male and female elements are mutually configured such that said male and female elements may be united by threading said external and internal threadings until said first and second abutment surfaces abut one another, wherein:

a) crests and roots of each of said vanishing threads are radially limited by a convergence of a frustoconical surface of one of said male and female elements and a cylindrical surface of the other of said male and female elements, b) the abutting first and second abutting surfaces form a central abutment, and c) the tightness surfaces of said male and female elements mate in pairs to form two fluid tight seal surfaces having ring shaped contact zones.

2. The threaded joint of claim 1 wherein the cylindrical surfaces include two radially shifted cylindrical surfaces meeting at the first ring-shaped abutment surface and separating said external threading, and two radially shifted cylindrical surfaces meeting at the second ring-shaped abutment surface and separating said internal threading.

3. The threaded joint of claim 1 wherein a generatrix of each of said first and second abutment surfaces is inclined, with respect to the axis of the joint, said inclination angle being between 90° and 70°.

4. The threaded joint of claim 1 wherein a height of the threads is between 6 and 12% of the thickness of the tube.

5. The threaded joint of claim 1 wherein the negative inclination angle of the load flanks of each said threading has a value between 3° and 20°.

6. The threaded joint of claim 1 wherein stabbing flanks of each said threading have a positive inclination angle between 8° and 30°.

7. The threaded joint of claim 6 wherein the stabbing flanks have a chamfer having a positive inclination between 15° and 35° with respect to an adjacent part of stabbing flanks.

8. The threaded joint of claim 1 wherein said frustoconical sections of said male and female elements and said tightness surfaces are sloped such that a thickness of said male and female elements decreases toward distal ends thereof, wherein each of said seal surfaces comprises one of said tightness surfaces on a thin distal end of the respective one of the male and female elements mating with another of said tightness surfaces on a thick end of the respective one of the male and female elements such that the thin distal end is elastically deformed when said male and female elements are united by threading said external and internal threading until said first and second abutment surfaces abut one another.

9. The threaded joint of claim 1 wherein said tightness surfaces are frustoconical.

10. The threaded joint of claim 1 including a tightness ring housed in said female element such that the tightness ring occupies a space between the distal end of said male element and an internal end of said female element when said male and female elements are united by threading said external and internal threading until said first and second abutment surfaces abut one another.

11. The threaded joint of claim 1 wherein the slope of the frustoconical threadings is between $1/16$ and $1/10$ with respect to the axis of the tube.

12. The threaded joint of claim 1 wherein the female element is formed on a tube whose outside diameter is larger than an outside diameter of the mid-portion toward the distal end of the female element.

13. The threaded joint of claim 1 wherein the male element is formed on a tube whose inside diameter is smaller than an inside diameter of the mid-portion toward the distal end of the male element.

* * * * *